United States Patent
Runde

(10) Patent No.: US 7,331,902 B2
(45) Date of Patent: Feb. 19, 2008

(54) METHOD FOR PERFORMING HIGH THROTTLE NEUTRAL TO RANGE SHIFTS

(75) Inventor: Jeffrey K. Runde, Fishers, IN (US)

(73) Assignee: General Motors Corporation, Detroit, MI (US)

( * ) Notice: Subject to any disclaimer, the term of this patent is extended or adjusted under 35 U.S.C. 154(b) by 265 days.

(21) Appl. No.: 11/145,283

(22) Filed: Jun. 3, 2005

(65) Prior Publication Data
US 2006/0276303 A1     Dec. 7, 2006

(51) Int. Cl.
*F16H 61/00*   (2006.01)
(52) U.S. Cl. .................. 477/117; 477/116; 475/116; 475/128; 475/132
(58) Field of Classification Search ........... 475/116, 475/127, 128, 132; 477/116, 117
See application file for complete search history.

(56) References Cited

U.S. PATENT DOCUMENTS 6,332,860 B1 * 12/2001 Hubbard et al. ............ 477/143
6,478,713 B1 * 11/2002 Runde et al. ............... 477/107
7,128,686 B2 * 10/2006 Hitch et al. ................. 477/53

* cited by examiner

*Primary Examiner*—David D. Le

(57) ABSTRACT

According to a preferred embodiment of the present invention, a "special neutral" is commanded to initiate the neutral to range shift. The "special neutral" of the present invention is special in that while the transmission output speed remains unconstrained, the transmission input speed is locked at zero. This condition is particularly advantageous because on-coming clutches may be applied without relative motion between the respective clutch plates. Therefore, by initiating the neutral to range shift from the "special neutral" of the present invention, the ratio change may take place irrespective of engine speed, with zero slip loss and more quickly than previously possible.

15 Claims, 2 Drawing Sheets

METHOD FOR PERFORMING HIGH THROTTLE NEUTRAL TO RANGE SHIFTS

TECHNICAL FIELD

The present invention is drawn to a method for allowing high throttle neutral to range shifts in an automatic transmission.

BACKGROUND OF THE INVENTION

Automatic transmissions start up in a neutral state and are then required to shift to range as commanded by the driver. A "shift to range" is a shift to any selectable gear range (e.g., drive, low or reverse) having one or more speed ratios (e.g., $1^{st}$ gear, $2^{nd}$ gear) and is typically performed at closed throttle. Transmission damage or distress can occur if the driver makes this shift with high throttle input.

SUMMARY OF THE INVENTION

The present invention provides a method for performing a neutral to range shift at a full throttle condition without any transmission distress. Additionally, this method performs the neutral to range shift more quickly than previously possible.

According to a preferred embodiment of the present invention, a "special neutral" is commanded to initiate the neutral to range shift. A conventional neutral yields a neutral input and neutral output condition. This means that the transmission does not constrain either the transmission input speed or the transmission output speed. The "special neutral" of the present invention is special in that while the transmission output speed remains unconstrained, the transmission input speed is locked at zero. By initiating the neutral to range shift from the "special neutral" of the present invention, the ratio change may take place irrespective of engine speed, with zero slip loss and more quickly than previously possible.

According to a method of the present invention, the neutral to range shift takes place in the following manner. When the vehicle is started, a combination of clutches adapted to affect the locked input special neutral is applied. Thereafter, an algorithm determines whether a shift to range has been selected. If a speed range has been selected, a combination of clutches adapted to apply a speed ratio within the selected range is engaged irrespective of the vehicle's engine speed without damage to the transmission. After the clutches for the non-neutral speed ratio are engaged, all other clutches are disengaged such that the ratio change is complete and the vehicle can accelerate.

In one aspect of the present invention, one or more of the combination of clutches adapted to apply a speed ratio is applied at full pressure.

In another aspect of the present invention, one or more of the clutches being disengaged are slowly released to smoothly transition into the desired gear ratio.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

The present invention provides a method for allowing a neutral to range shift at a full throttle condition without any transmission distress. Additionally, this method performs the neutral to range shift more quickly than previously possible. The present invention will hereinafter be described in the context of an exemplary powertrain 10 (shown in FIG. 1) used for illustrative purposes. It should, however, be appreciated that the teachings of the present invention may be applied to any number of alternate transmissions as well.

Figures 1, 2:
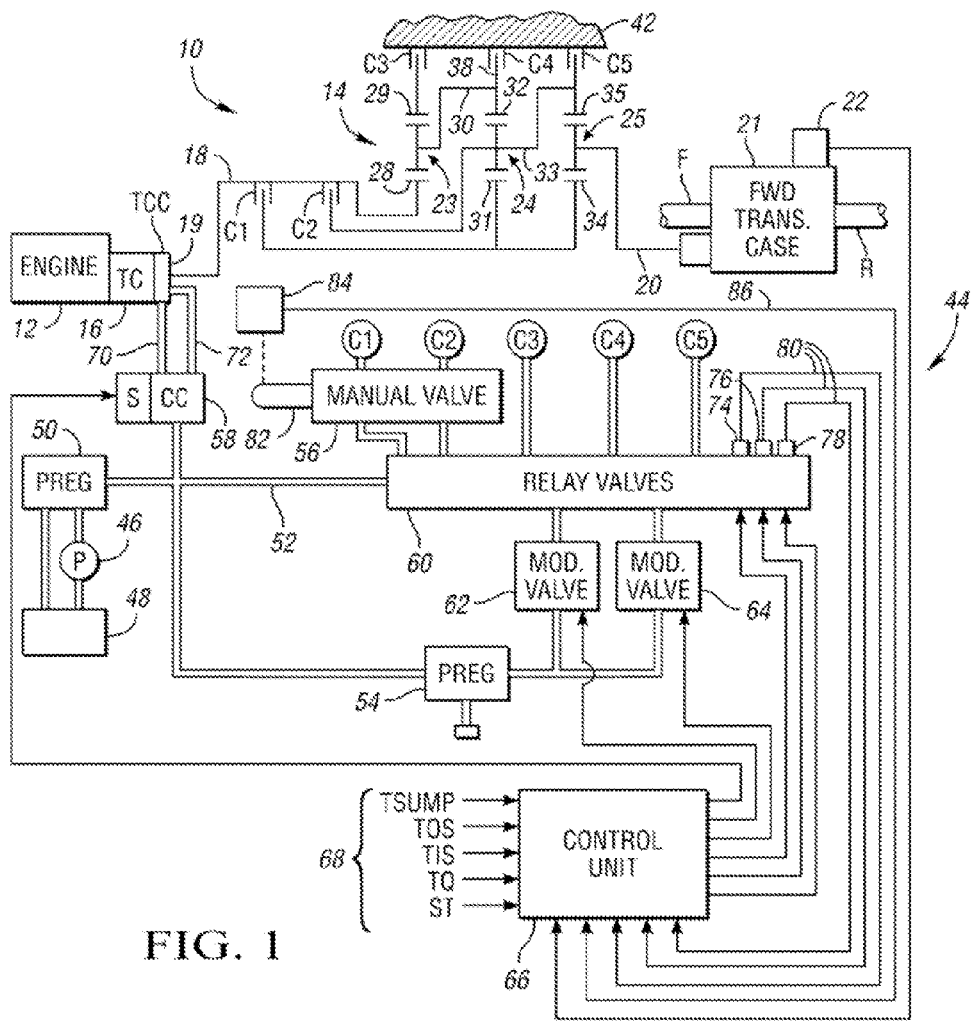
FIG. 1 is a schematic illustration of a powertrain including an automatic transmission.
FIG. 2 is a truth table indicating a relationship between transmission clutch activation and corresponding speed ratio.

Referring to FIG. 1, the vehicle powertrain 10 includes an engine 12, a transmission 14, and a torque converter 16 providing a fluid coupling between engine 12 and transmission input shaft 18. A torque converter clutch 19 is selectively engaged under certain conditions to provide a mechanical coupling between engine 12 and transmission input shaft 18. The transmission output shaft 20 is coupled to the driving wheels of the vehicle in one of several conventional ways. The illustrated embodiment depicts a four-wheel-drive (FWD) application in which the output shaft 20 is connected to a transfer case 21 that is also coupled to a rear drive shaft R and a front drive shaft F. Typically, the transfer case 21 is manually shiftable to selectively establish one of several drive conditions, including various combinations of two-wheel-drive and four-wheel drive, and high or low speed range, with a neutral condition occurring intermediate the two and four wheel drive conditions.

The transmission 14 has three inter-connected planetary gear sets, designated generally by the reference numerals 23, 24 and 25. The planetary gear set 23 includes a sun gear member 28, a ring gear member 29, and a planet carrier assembly 30. The planet carrier assembly 30 includes a plurality of pinion gears rotatably mounted on a carrier member and disposed in meshing relationship with both the sun gear member 28 and the ring gear member 29. The planetary gear set 24 includes a sun gear member 31, a ring gear member 32, and a planet carrier assembly 33. The planet carrier assembly 33 includes a plurality of pinion gears rotatably mounted on a carrier member and disposed in meshing relationship with both the sun gear member 31 and the ring gear member 32. The planetary gear set 25 includes a sun gear member 34, a ring gear member 35, and a planet carrier assembly 36. The planet carrier assembly 36 includes a plurality of pinion gears rotatably mounted on a carrier member and disposed in meshing relationship with both the sun gear member 34 and the ring gear member 35.

The input shaft 18 continuously drives the sun gear 28 of gear set 23, selectively drives the sun gears 31, 34 of gear sets 24, 25 via clutch C1, and selectively drives the carrier 33 of gear set 24 via clutch C2. The ring gears 29, 32, 35 of gear sets 23, 24, 25 are selectively connected to ground 42 via clutches (i.e., brakes) C3, C4 and C5, respectively.

As diagrammed in FIG. 2, the state of the clutches C1-C5 (i.e., engaged or disengaged) can be controlled to provide six forward speed ratios (1, 2, 3, 4, 5, 6), a reverse speed ratio (R) or a neutral condition (N). For example, the first forward speed ratio is achieved by engaging clutches C1 and C5. Shifting from one forward speed ratio to another is generally achieved by disengaging one clutch (referred to as the off-going clutch) while engaging another clutch (referred to as the on-coming clutch). For example the transmission 14 is shifted from first to second by disengaging clutch C5 while engaging clutch C4.

The torque converter clutch 19 and the transmission clutches C1-C5 are controlled by an electro-hydraulic control system, generally designated by the reference numeral 44. The hydraulic portions of the control system 44 include a pump 46 which draws hydraulic fluid from a reservoir 48, a pressure regulator 50 which returns a portion of the pump output to reservoir 48 to develop a regulated pressure in line 52, a secondary pressure regulator valve 54, a manual valve 56 manipulated by the driver of the vehicle and a number of solenoid-operated fluid control valves 58, 60, 62 and 64.

The electronic portion of the electro-hydraulic control system 44 is primarily embodied in the transmission control unit 66, or controller, which is microprocessor-based and conventional in architecture. The transmission control unit 66 controls the solenoid-operated fluid control valves 58-64 based on a number of inputs 68 to achieve a desired transmission speed ratio. Such inputs include, for example, signals representing the transmission input speed TIS, a driver torque command TQ, the transmission output speed TOS, the hydraulic fluid temperature Tsump, and the shift type ST (for example, a 3-2 downshift). Sensors for developing such signals may be conventional in nature, and have been omitted for simplicity.

The control lever 82 of manual valve 56 is coupled to a sensor and display module 84 that produces a diagnostic signal on line 86 based on the control lever position; such signal is conventionally referred to as a PRNDL signal, since it indicates which of the transmission ranges (P, R, N, D or L) has been selected by the vehicle driver. Finally, fluid control valves 60 are provided with pressure switches 74, 76, 78 for supplying diagnostic signals to control unit 66 on lines 80 based on the respective relay valve positions. The control unit 66, in turn, monitors the various diagnostic signals for the purpose of electrically verifying proper operation of the controlled elements.

The solenoid-operated fluid control valves 58-64 are generally characterized as being either of the on/off or modulated type. To reduce cost, the electro-hydraulic control system 44 is configured to minimize the number of modulated fluid control valves, as modulated valves are generally more expensive to implement. To this end, fluid control valves 60 are a set of three on/off relay valves, shown in FIG. 1 as a consolidated block, and are utilized in concert with manual valve 56 to enable controlled engagement and disengagement of each of the clutches C1-C5 with only two modulated valves 62, 64. For any selected ratio, the control unit 66 activates a particular combination of relay valves 60 for coupling one of the modulated valves 62, 64 to the on-coming clutch, and the other one of the modulated valves 62, 64 to the off-going clutch. It should be appreciated, however, that the transmission 14 may alternately implement additional modulated valves to facilitate the control of the clutches C1-C5 according to alternate embodiments.

The modulated valves 62, 64 each comprise a conventional pressure regulator valve biased by a variable pilot pressure that is developed by current controlled force motors (not shown). Fluid control valve 58 is also a modulated valve, and controls the fluid supply path to converter clutch 19 in lines 70, 72 for selectively engaging and disengaging the converter clutch 19. The transmission control unit 66 determines pressure commands for smoothly engaging the on-coming clutch while smoothly disengaging the off-going clutch to shift from one speed ratio to another, develops corresponding force motor current commands, and then supplies current to the respective force motors in accordance with the current commands. Thus, the clutches C1-C5 are responsive to the pressure commands via the valves 58-64 and their respective actuating elements (e.g., solenoids, current-controlled force motors).

As indicated above, each shift from one speed ratio to another includes a fill or preparation phase during which an apply chamber of the on-coming clutch is filled in preparation for torque transmission. Fluid supplied to the apply chamber compresses an internal return spring (not shown), thereby stroking a piston (not shown). Once the apply chamber is filled, the piston applies a force to the clutch plates, developing torque capacity beyond the initial return spring pressure. Thereafter, the clutch transmits torque in relation to the clutch pressure, and the shift can be completed using various control strategies. The usual control strategy involves commanding a maximum on-coming clutch pressure for an empirically determined fill time, and then proceeding with the subsequent phases of the shift. The volume of fluid required to fill an apply chamber and thereby cause the clutch to gain torque capacity is referred to as the "clutch volume."

A method for allowing high throttle neutral to range shifts according to the present invention will now be described as it applies to the transmission 14 described hereinabove. It should, however, be appreciated that the method of the present invention is applied to the transmission 14 for exemplary purposes only, and this method may also be applied to any number of alternate transmission configurations as well.

Figure 3:
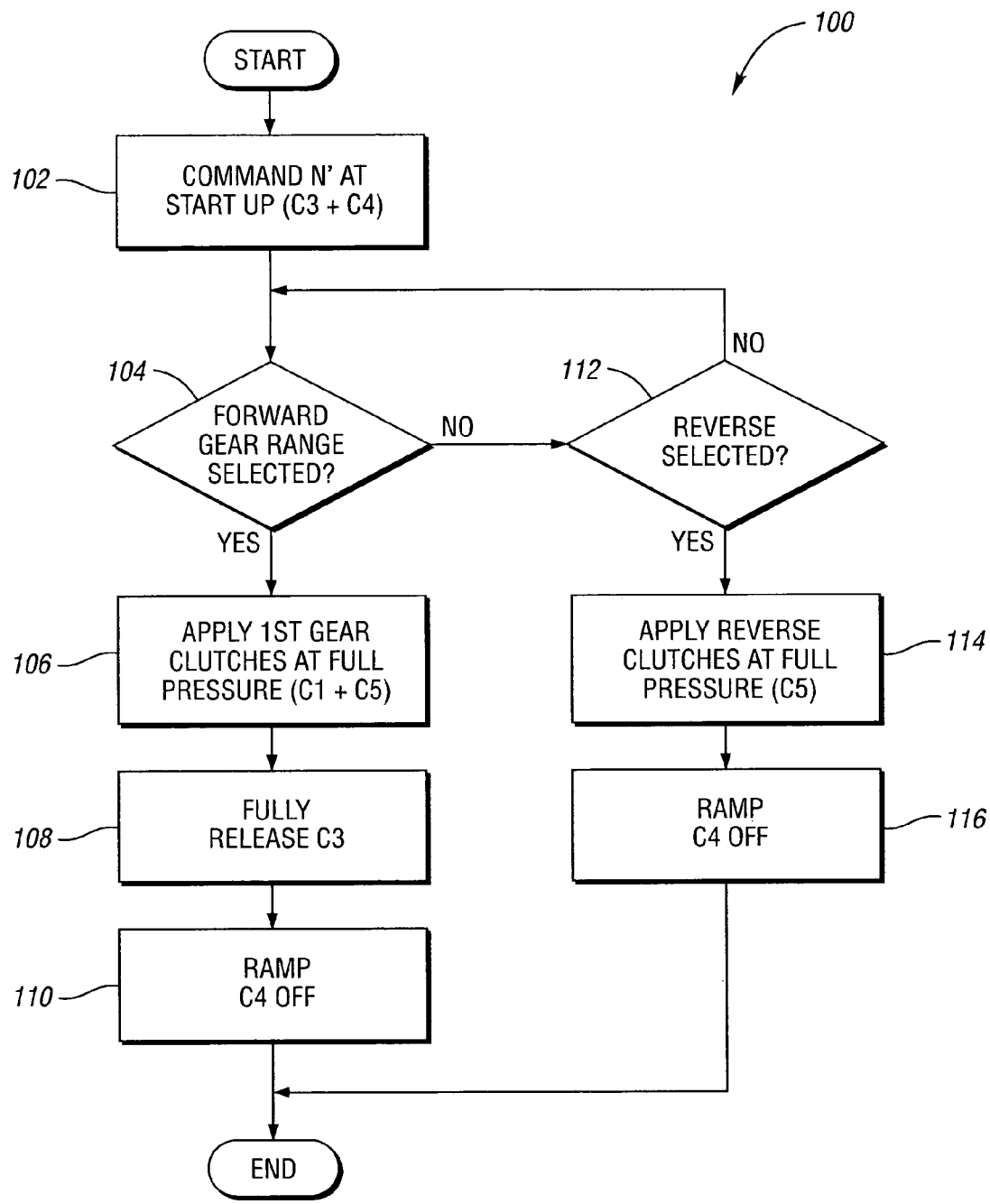
FIG. 3 is a flow chart depicting a method of the present invention.

The method for allowing high throttle neutral to range shifts includes the algorithm 100 shown in detail in FIG. 3. More precisely, FIG. 3 shows a series of block diagrams representing steps performed by the control unit 66.

At step 102, the control unit 66 commands a "special neutral" N' (shown in FIG. 2) when the vehicle is started. A conventional neutral N (shown in FIG. 2) yields a neutral input and neutral output condition. This means that the transmission does not constrain either the transmission input speed or the transmission output speed. The "special neutral" N' of the present invention is special in that while the transmission output speed remains unconstrained, the transmission input speed is locked at zero. For the exemplary transmission 14 described hereinabove, N' may be attained by engaging clutches C3 and C4, however, the specific clutches necessary to attain N' may vary for other transmissions.

At step 104, the algorithm 100 determines whether a forward gear range has been selected by the operator. If a forward gear range has been selected at step 104, the algorithm 100 proceeds to step 106. If a forward gear range has not been selected at step 104, the algorithm 100 proceeds to step 112. At step 106, the algorithm 100 applies the combination of clutches that engage the first gear speed ratio. As will be described in detail hereinafter, when N' is engaged the remaining clutches have zero slip and therefore the clutches for the first gear speed ratio are preferably applied at full pressure. For the exemplary transmission 14 described hereinabove, the first gear speed ratio may be attained by engaging clutches C1 and C5, however, the specific clutches necessary to attain first gear may vary for other transmissions. At step 108, the algorithm 100 releases clutch C3. At step 110, clutch C4 released. According to a preferred embodiment, clutch C4 is slowly released or ramped off to smoothly effect the ratio change. After clutch C4 has been ramped off at step 110, only clutches C1 and C5 remain engaged such that the vehicle is in first gear and the neutral to range shift of the present invention has been completed.

At step 112, the algorithm 100 determines whether the reverse gear range has been selected by the operator. If the reverse range has been selected at step 112, the algorithm 100 proceeds to step 114. If the reverse range has not been selected at step 112, the algorithm 100 repeats step 104 while the transmission remains in the "special neutral" N'. At step 114, the algorithm 100 applies the combination of clutches that engage the reverse gear speed ratio. As will be described in detail hereinafter, when N' is engaged the remaining clutches have zero slip and therefore the clutches that engage the reverse speed ratio are preferably applied at full pressure. For the exemplary transmission 14 described hereinabove, the reverse speed ratio may be attained by engaging clutches C3 and C5, however, the specific clutches necessary to attain the reverse speed ratio may vary for other transmissions. As clutch C3 is already applied (from step 102), only clutch C5 is applied at step 114 to engage the reverse gear speed ratio. At step 116, clutch C4 released. According to a preferred embodiment, clutch C4 is slowly released or ramped off to smoothly effect the ratio change. After clutch C4 has been ramped off at step 116, only clutches C3 and C5 remain engaged such that the vehicle is in reverse and the neutral to range shift of the present invention has been completed.

"Slip" is a phenomenon wherein clutch plates (not shown) rotating at different speeds are brought into contact and rotate (or "slip") relative to each other while only partially engaged, before they become completely engaged and rotate together. While the clutch plates are slipping, heat is generated that must be dissipated and the contact surfaces of the clutch plates wear quickly. Additionally, as the relative speed of the clutch plates increases, an on-coming clutch generally is slowly applied to avoid transmission damage or shift disturbances that may be objectionable to consumers. A conventional high throttle neutral to range shift is problematic because the high throttle input increases the unconstrained transmission input speed which creates a large relative speed differential for the clutch plates. In other words, clutch plates rotating at the high transmission input speed must be brought into engagement with stationary clutch plates to initiate the ratio change.

As previously indicated with respect to steps 106 and 114, when N' is engaged the remaining clutches have zero slip and therefore any on-coming clutches are preferably applied at full pressure. Because N' locks the transmission input speed at zero and the transmission output speed is also zero during a neutral to range shift, there is no relative speed differential between clutch plates such that the on-coming clutches can be brought on as quickly as possible and at full pressure without any slip. Therefore, according to the method of the present invention, the neutral to range shift can be accomplished without any slip loss and without the time required to gradually apply the on-coming clutches so that the neutral to range shift of the present invention is more efficient and faster than previously possible. Additionally, as the transmission input speed is locked at zero regardless of the engine output speed, the neutral to range shift can be made at full throttle without risking damage to the transmission.

While the best modes for carrying out the invention have been described in detail, those familiar with the art to which this invention relates will recognize various alternative designs and embodiments for practicing the invention within the scope of the appended claims.

The invention claimed is:

1. A method for performing a neutral to range shift in a vehicle with an engine and an automatic transmission having a plurality of clutches and a plurality of gear ratios, the method comprising:
   applying a first combination of clutches adapted to induce a locked input special neutral automatically upon start up of the engine;
   determining whether a gear range has been selected;
   applying a second combination of clutches adapted to effect a speed ratio within said gear range, wherein said clutches adapted to engage the speed ratio are applied irrespective of the vehicle's engine speed without damage to the transmission; and
   disengaging all clutches other than said second combination of clutches.

2. The method of claim 1, wherein said disengaging all clutches further includes slowly releasing the clutches.

3. The method of claim 2, wherein said applying a second combination of clutches includes applying the second combination of clutches at full pressure.

4. The method of claim 1, wherein said determining whether a gear range has been selected includes determining whether a forward gear range has been selected.

5. The method of claim 4, wherein said applying a second combination of clutches includes applying a second combination of clutches adapted to effect a first gear speed ratio if said forward gear range has been selected.

6. The method of claim 1, wherein said determining whether a gear range has been selected includes determining whether a reverse gear range has been selected.

7. The method of claim 6, wherein said applying a second combination of clutches includes applying a second combination of clutches adapted to effect a reverse gear speed ratio if said reverse gear range has been selected.

8. A method for performing a neutral to range shift in a vehicle with an engine and an automatic transmission having a plurality of clutches and a plurality of gear ratios, said method comprising:
   applying a combination of clutches adapted to induce a locked input special neutral automatically upon start up of the engine;
   determining whether a forward gear range has been selected;
   applying a combination of clutches adapted to effect a first gear speed ratio if said forward gear range has been selected, wherein said clutches adapted to engage the first gear speed ratio are applied irrespective of the vehicle's engine speed without damage to the transmission;
   disengaging all clutches not required for the first gear speed ratio if said forward gear range has been selected;
   determining whether a reverse gear range has been selected;
   applying a combination of clutches adapted to effect a reverse gear speed ratio if said reverse gear range has been selected, wherein said clutches adapted to engage the reverse gear speed ratio are applied irrespective of the vehicle's engine speed without damage to the transmission; and
   disengaging all clutches not required for the reverse gear speed ratio if said reverse gear range has been selected.

9. The method of claim 8, wherein said disengaging all clutches not required for the first gear speed ratio further includes slowly releasing the clutches.

10. The method of claim 8, wherein said disengaging all clutches not required for the reverse gear speed ratio further includes slowly releasing the clutches.

11. The method of claim 8, wherein applying a combination of clutches adapted to effect the first gear speed ratio includes applying the combination of clutches adapted to effect the first gear speed ratio at full pressure.

12. The method of claim 8, wherein applying a combination of clutches adapted to effect the reverse gear speed ratio includes applying the combination of clutches adapted to effect the reverse gear speed ratio at full pressure.

13. A method for performing a neutral to range shift in a vehicle with an engine and an automatic transmission having a plurality of clutches and a plurality of gear ratios, the method comprising:

applying a first combination of clutches adapted to induce a locked input special neutral automatically upon start up of the engine;

determining whether a forward gear range has been selected;

applying a second combination of clutches at full pressure if said forward gear range has been selected, said second combination of clutches being adapted to engage a first gear speed ratio, wherein said second combination of clutches are applied irrespective of the vehicle's engine speed without damage to the transmission;

disengaging all clutches not required for the first gear speed ratio if said forward gear range has been selected;

determining whether a reverse gear range has been selected;

applying a third combination of clutches at full pressure if said reverse gear range has been selected, said third combination of clutches being adapted to engage a reverse gear speed ratio, wherein said third combination of clutches are applied irrespective of the vehicle's engine speed without damage to the transmission; and disengaging all clutches not required for the reverse gear speed ratio if said reverse gear range has been selected.

14. The method of claim 13, wherein said disengaging all clutches not required for the first gear speed ratio further includes slowly releasing the clutches.

15. The method of claim 13, wherein said disengaging all clutches not required for the reverse gear speed ratio further includes slowly releasing the clutches.

* * * * *